(12) United States Patent
Song

(10) Patent No.: US 8,692,958 B2
(45) Date of Patent: Apr. 8, 2014

(54) POLARIZATION FILM

(75) Inventor: Sung Hun Song, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 13/447,697

(22) Filed: Apr. 16, 2012

(65) Prior Publication Data

US 2012/0194909 A1 Aug. 2, 2012

Related U.S. Application Data

(63) Continuation of application No. 12/415,141, filed on Mar. 31, 2009, now Pat. No. 8,179,500.

(30) Foreign Application Priority Data

Apr. 9, 2008 (CN) .......................... 2008 1 0103608

(51) Int. Cl.
*G02F 1/1335* (2006.01)

(52) U.S. Cl.
USPC .......................................................... 349/96

(58) Field of Classification Search
None
See application file for complete search history.

(56) References Cited

U.S. PATENT DOCUMENTS

| | | | | |
|---|---|---|---|---|
| 6,661,487 B2 * | 12/2003 | Takahashi et al. | ............ | 349/115 |
| 7,038,744 B2 * | 5/2006 | Kuzuhara et al. | ............... | 349/96 |
| 8,179,500 B2 * | 5/2012 | Song | ............................... | 349/96 |
| 2005/0206810 A1 | 9/2005 | Sasaki et al. | | |
| 2006/0082703 A1 * | 4/2006 | Kuzuhara et al. | ............... | 349/96 |
| 2007/0195226 A1 | 8/2007 | Aminaka et al. | | |
| 2008/0137187 A1 | 6/2008 | Nishida et al. | | |
| 2009/0103015 A1 | 4/2009 | Aminaka | | |
| 2009/0322994 A1 | 12/2009 | Satake et al. | | |

FOREIGN PATENT DOCUMENTS

| | | |
|---|---|---|
| CN | 101103286 A | 1/2008 |
| JP | 2005-037418 A | 2/2005 |
| JP | 2006-301169 A | 11/2006 |
| JP | 2003-107477 A | 4/2009 |
| WO | 2008/004403 A1 | 1/2008 |

OTHER PUBLICATIONS

USPTO NFOA mailed Jun. 15, 2011 in connection with U.S. Appl. No. 12/415,141.
USPTO FOA mailed Oct. 11, 2011 in connection with U.S. Appl. No. 12/415,141.
USPTO NOA mailed Jan. 20, 2012 in connection with U.S. Appl. No. 12/415,141.

* cited by examiner

*Primary Examiner* — Tina Wong
(74) *Attorney, Agent, or Firm* — Ladas & Parry LLP

(57) ABSTRACT

A polarization film comprising at least a polarization layer that is subject to a laminating treatment to be stretched along a predetermined laminating direction in the plane of the polarization layer to realize polarization, and an adhesive layer that is provided on a surface of the polarization layer and capable of being affixed onto a base. The adhesive layer has a maximal shrinkage resistance in the laminating direction of the polarization layer.

8 Claims, 2 Drawing Sheets

POLARIZATION FILM

CROSS-REFERENCE

This application is a continuation of the application Ser. No. 12/415,141, which was filed on Mar. 31, 2009 and entitled "Polarization Film."

BACKGROUND

Embodiments of the present invention relate to an optical film and, in particular, a polarization film.

In recent years, liquid crystal displays (LCDs) are experiencing a rapid development. More and more LCDs are putting into the market, and the application fields have been expanded. At the same time, there are still some problems on the display quality. Among these problems, the polarization film is one of the important factors causing the non-uniform luminance and the poor picture quality of the LCDs.

Currently, a polarization film generally comprises an adhesive layer (PSA), a light compensation layer (WVDL), a support layer (TAC), a polarization layer (PVA), a surface treatment layer, and the like. The fabricating process of the polarization film generally uses the processes such as pre-curing, laminating, coating, cutting, checking, packaging, and the like. The laminating process stretches the polarization layer in a predetermined laminating direction so that the iodine molecules within the layer are aligned along the laminating direction. When the light passes through the polarization layer (PVA), the iodine molecules absorb the light perpendicular to their alignment direction and allow the light parallel to their alignment direction to pass. In use, the polarization film is affixed onto the surface of a LCD panel, i.e., the adhesive layer (PSA) is affixed onto the surface of the color filter substrate and the array substrate of the LCD panel.

Since the laminating of the polarization layer (PVA) is a process in which exterior energy is compulsively applied to the layer in an original state, the polarization layer is in a state of absorbing energy, and there is a tendency for the polarization layer to return to the original state and release the energy at the conditions of high temperature and high humidity, i.e., there is a shrinkage force. Since the adhesive layer (PSA) is affixed onto the surface of the LCD panel, interaction force is generated between the polarization layer (PVA) and the adhesive layer (PSA). FIG. 5 is a schematic view showing the shrinkage state of the polarization film on the color filter substrate, FIG. 6 is a schematic view showing the shrinkage state of the polarization layer on the array substrate, and FIG. 7 is a schematic view showing the variation of light absorption axis caused by the shrinkage of the polarization film. As shown in FIGS. 5, 6 and 7, the polarization film shrinks as a whole in the condition of high temperature and high humidity, but it mainly shrinks along a direction opposite to the laminating direction under a restoring force. The shrinkage along the laminating direction is different from that along other directions other than the laminating direction, i.e., the polarization film on the color filter substrate mainly shrinks in direction A (FIG. 5), and the polarization film on the array substrate mainly shrinks in direction B (FIG. 6). Direction A and direction B are directions opposite to the laminating directions of the polarization film on the color filter substrate and on the array substrate, respectively. Normally, the light absorption axis of the polarization film on the color filter substrate and that of the polarization film on the array substrate are perpendicular to each other. However, due to shrinkage in direction A of the polarization film on the color filter substrate and shrinkage in direction B of the polarization film on the array substrate, the orthogonal relationship between the light absorption axes in the peripheral area of the two polarization films is changed (FIG. 7), so that the light leakage and the non-uniform luminance may arise in a black state, leading to the low quality of picture in a black state.

SUMMARY

An embodiment of the invention provides a polarization film comprising at least a polarization layer that is subject to a laminating treatment to be stretched along a predetermined laminating direction in the plane of the polarization layer to realize polarization. The polarization film further comprises an adhesive layer that is provided on a surface of the polarization layer and capable of being affixed onto a base; and the adhesive layer has a maximal shrinkage resistance in the laminating direction of the polarization layer.

According to an embodiment, the adhesive layer has a minimal shrink resistance in a direction perpendicular to the laminating direction of the polarization layer.

According to an embodiment, the adhesive layer comprises a plurality of adhesive regions and a plurality of non-adhesive regions, and the adhesive regions and the non-adhesive regions are arranged alternatively along the laminating direction of the polarization layer.

According to an embodiment, the non-adhesive regions may be elongated holes extending along a direction perpendicular to the laminating direction of the polarization layer. The length of the elongated holes may decrease gradually along the laminating direction of the polarization layer. The non-adhesive regions also may be hole groups that are arranged along a direction perpendicular to the laminating direction of the polarization layer. The number of the holes in the hole groups may decrease gradually along the laminating direction of the polarization layer, and the alternating times for the adhesive regions and the non-adhesive regions may decrease gradually along the direction perpendicular to the laminating direction of the polarization layer.

According to an embodiment, the polarization film may further comprise a surface treatment layer, a first support layer, and a second support layer, and the polarization layer is interposed between the first support layer and the second support layer.

An embodiment of the invention also provides a polarization film for a liquid crystal display (LCD) panel comprising at least an adhesive layer that is capable of being affixed onto the LCD panel and a polarization layer subject to a laminating treatment along a predetermined laminating direction. The adhesive layer comprises a plurality of adhesive regions and a plurality of non-adhesive regions, and the adhesive regions and the non-adhesive regions are arranged along the laminating direction alternatively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE EMBODIMENTS

Figure 1:
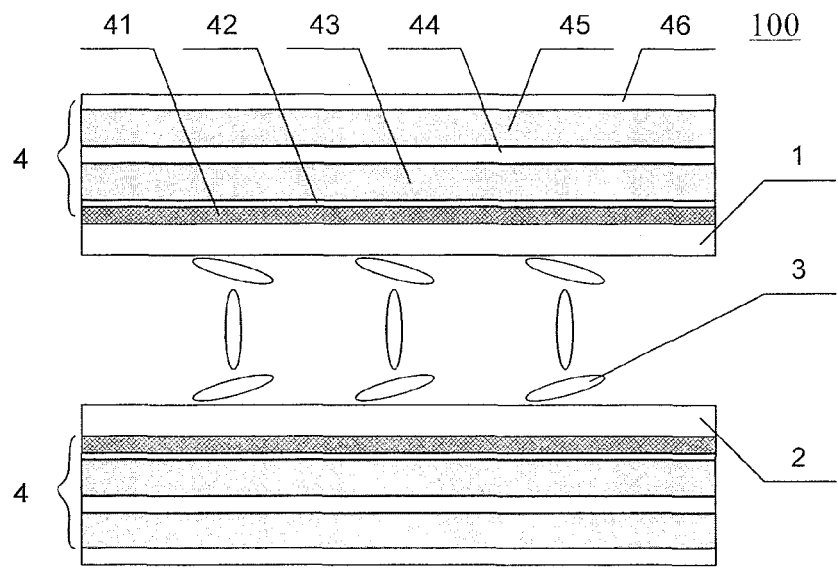
FIG. 1 is a schematic view of a liquid crystal display panel.

FIG. 1 is a schematic view of the structure of a LCD panel 100. The structure of the LCD panel 100 mainly comprises a color filter substrate 1 and an array substrate 2 that are bonded together with a liquid crystal layer 3 sandwiched therebetween, and the outer surfaces of the color filter substrate 1 and the array substrate 2 are provided with a polarization film 4, respectively. A black matrix and RGB color resin may be provided on the color filter substrate 1, and a plurality of gate lines, a plurality of data lines, thin film transistors and pixel electrodes may be provided on the array substrate 2. Twist nematic (TN) liquid crystal may be used for the liquid crystal layer 3, the fundamental physical characteristics of which has a refractive anisotropy of $\Delta n=+0.7\sim+1.3$ and a permittivity anisotropy of $\Delta \epsilon=+4.0\sim+12$. The polarization film 4 is used to adjust the intensity and the direction of the light output from a backlight module. As shown in FIG. 1, along a direction outward from the surfaces of the color filter substrate 1 and the array substrate 2, the polarization film 4 comprises an adhesive layer (PSA) 41, a liquid crystal compensation layer (DLC) 42, a first support layer (TAC) 43, a polarization layer (PVA) 44, a second support layer (TAC) 45, and a surface treatment layer 46. The adhesive layer 41 is used to affix the polarization films 4 onto the outer surfaces of the color filter substrate 1 and the array substrate 2; the liquid crystal compensate layer 42 is used to compensate the smaller view angle when a black picture is displayed; the polarization layer 44 is used to selectively transmit the light output from the backlight module; the first support layer 43 and the second support layer 45 are disposed on and under the polarization layer 44 for supporting the polarization layer 44, and the first support layer 43 and the second support layer 45 generally adopts a colorless material with higher transmissivity; the surface treatment layer 46 is used to deal with the problems such as surface reflection through an anti-glare treatment and the like. The base which the polarization film according to the embodiment is affixed to is not limited to the color filter substrate and the array substrate and may be other kind of bases.

Figure 2:
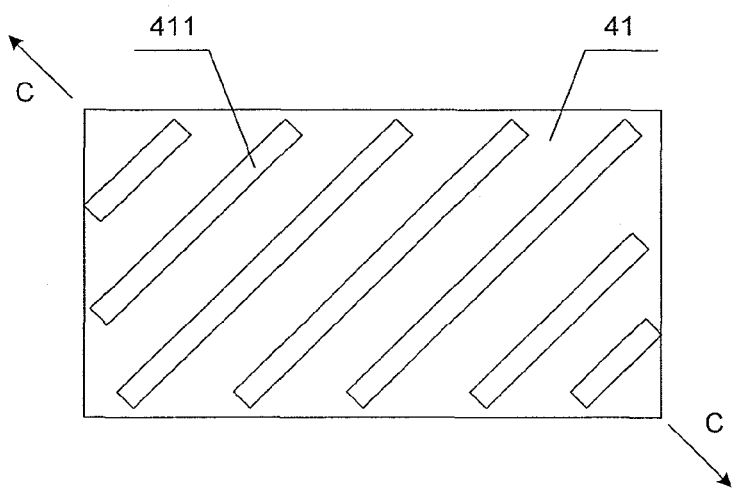
FIG. 2 is a schematic view showing an adhesive layer according to a first embodiment of the invention.

FIG. 2 is a schematic view of the structure of the adhesive layer according to the first embodiment of the invention. As shown in FIG. 2, the adhesive layer 41 according to the embodiment is formed with a plurality of rectangular holes 411 which are used as non-adhesive regions. The plurality of rectangular holes 411 are arranged in parallel with each other, and the long axis of each of the rectangular holes 411 is perpendicular to the laminating direction C of the polarization layer. The regions other than the plurality of rectangular holes 411 of the adhesive layer 41 are used as adhesive regions, by which the polarization film is affixed onto the outer surface of the color filter substrate or the array substrate. Thus, a structure of the adhesive layer in which the adhesive regions and the non-adhesive regions are alternately arranged with a predetermined interval between the neighboring ones along the laminating direction of the polarization layer is formed. The above mentioned structure with alternately arranged adhesive regions and non-adhesive regions enables the adhesive layer to have a maximum shrink resistance along the laminating direction of the polarization layer. Since the adhesive layer 41 is provided as the outmost layer of the polarization film, the surface of the polarization film is provided with a plurality of rectangular grooves when the adhesive layer and the other layers are combined to form the polarization film. When the polarization film is used, the surface of the adhesive regions of the adhesive layer is affixed onto the surface of the color filter substrate or the array substrate, and at the non-adhesive regions on the adhesive layer are formed a plurality of rectangular air layer between the surfaces of the polarization film and the color filter substrate or the array substrate; therefore, obtained is an alternately affixing structure, in which the adhesive layer is partially affixed to the surface of the color filter substrate or the array substrate.

Since the polarization layer (PVA) is formed of a high molecular material and subject to laminating treatment along a predetermined laminating direction, it suffers from distortion corresponding to varying environment, particularly in a condition of high temperature and high humidity. The polarization film tends to rebound along a direction opposite to the original laminating direction and produces a shrinking force. Although the polarization layer is also subject to shrinkage in the directions other than the laminating direction, but the shrinkage is relatively smaller than that in the laminating direction, thus giving rise to the non-uniform shrinkage. At the same time, since the laminating direction of the polarization layer on the color filter substrate is perpendicular to that of the polarization layer on the array substrate, the different distortion of the two polarization films changes the orthogonal relationship between the absorption axes of the two polarization layers, which causes the phenomenon of non-uniform luminance when displaying a black picture, leading to a poor quality picture. In the embodiment, the adhesive regions and the non-adhesive regions whose longitudinal directions are perpendicular to the laminating direction of the polarization layer are alternatively arranged with the predetermined interval at the interface between the adhesive layer and the base (the color filter substrate or the array substrate). With such configuration of the adhesive layer, the defect of the different shrinkage extent between the laminating direction of the polarization layer and the other directions can be avoided effectively. When such a polarization film is used in a LCD panel, the problem that the orthogonal relationship is changed by the distortion of the polarization layers on the color filter substrate and the array substrate can be overcome effectively. Specifically, when the polarization layer shrinks along the direction opposite to the laminating direction, the affixing portions between the adhesive layer and the color filter substrate or the array substrate act to increase resistance, which reduces the shrinkage of the polarization layer in the direction. When the polarization layer shrinks in the directions other than the laminating direction, the non-adhesive regions between the adhesive layer and the color filter substrate or the array substrate decrease the resistance against the shrinkage in these directions, in other words, the shrinkage extent in these directions is relatively increased, thus it enables the shrinkage extent of the polarization layer in the laminating direction and that in the directions other than the laminating direction to become closer to each other. In the embodiment, the rectangular holes are only a specific exemplary structure of the elongated hole according to the embodiment. The elongated hole may also be ellipse shaped hole, the strip shaped hole and the like.

Figure 3:
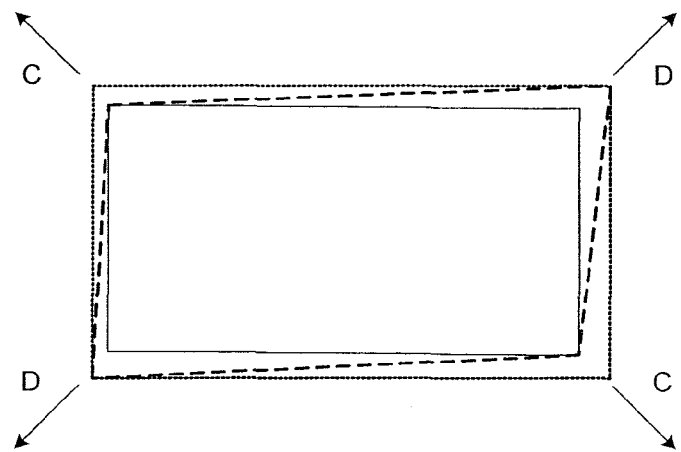
FIG. 3 is a schematic view showing the shrinkage extent of a polarization film according to the first embodiment of the invention.

FIG. 3 is the schematic view of the shrinkage extent of the polarization film according to the first embodiment of the invention, in which the real line represents the shape of the polarization film after shrinkage in the embodiment, and the broken line represents the shape of a conventional polarization film after shrinkage without the elongated holes. As shown in FIG. 3, in the laminating direction C of the polarization layer, the shrinkage extent of the polarization film according to the embodiment is substantially the same as the case without the elongated holes, while in the direction D other than the laminating direction C of the polarization layer, the shrinkage extent of the polarization film according to the embodiment is larger than the case without the elongated holes, which enables the shrinkage extent of the polarization film in the laminating direction and in other directions to become closer to each other, so that the shrinkage extent becomes uniform. Further, when such a polarization film is used in a liquid crystal display, since both the polarization film on the color filter substrate and on the array substrate shrink uniformly, the orthogonal relationship between the absorption axes of the two polarization films after shrinkage can be maintained so that a black picture can be formed with uniform luminance and high picture quality.

Figure 4:
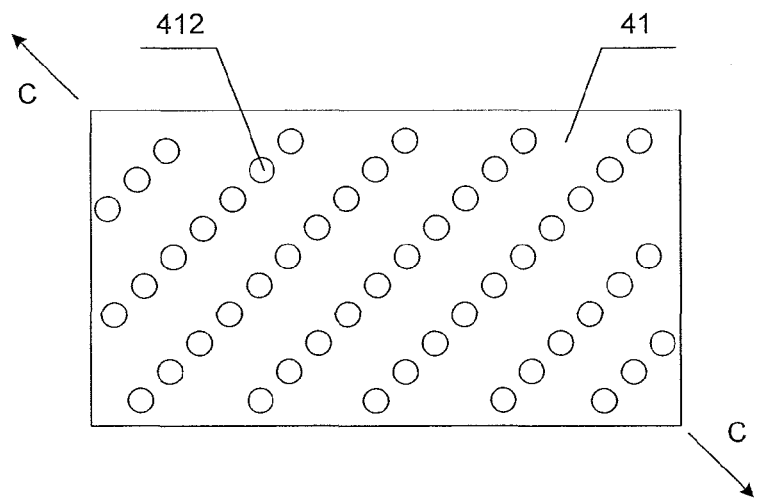
FIG. 4 is a schematic view showing an adhesive layer according to a second embodiment of the invention.
Figure 5:
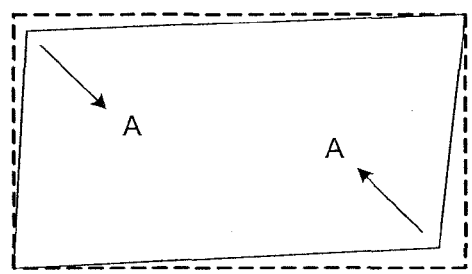
FIG. 5 is a schematic view showing the shrinkage state of a conventional polarization film on a color filter substrate.
Figure 6:
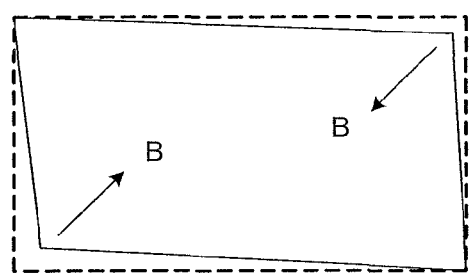
FIG. 6 is a schematic view showing the shrinkage state of a conventional polarization film on an array substrate.
Figure 7:
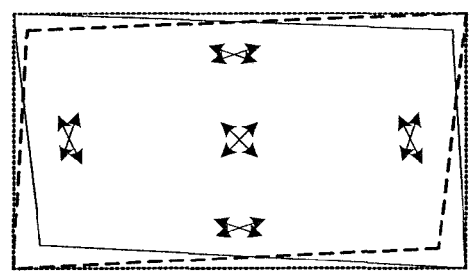
FIG. 7 is a schematic view showing the change of the light absorption axis caused by the shrinkage of conventional polarization films.

FIG. 4 is a schematic view of the structure of the adhesive layer according to a second embodiment of the invention. As shown in FIG. 4, the adhesive layer 41 of the embodiment is formed with a plurality of hole groups 412 that are used as non-adhesive regions, and each group in the hole groups 412 comprises a plurality of round holes arranged successively. The plurality of hole groups 412 are arranged in parallel to each other, and the extending direction of each group of the hole groups 412 is perpendicular to the laminating direction of the polarization layer. The regions on the adhesive layer other than the plurality of hole groups 412 are used as adhesive regions that are used to affix the polarization film onto the surfaces of the color filter substrate and the array substrate. Thus, such a adhesive layer structure is formed, in which the adhesive regions and the non-adhesive regions are alternatively arranged with a predetermined interval between the neighboring ones along the laminating direction of the polarization layer, and the adhesive regions and the non-adhesive regions are alternatively arranged with a predetermined interval between the neighboring ones along the direction perpendicular to the laminating direction of the polarization layer. At the same time, the number of holes in each group decreases gradually along the laminating direction of the polarization layer, and the alternating times of the adhesive regions and the non-adhesive regions decrease gradually along the direction perpendicular to the laminating direction of the polarization layer. The above mentioned structure of the alternatively arranged adhesive regions and non-adhesive regions enables the polarization layer to have a maximum shrinkage resistance in the laminating direction and a minimum shrinkage resistance in the direction perpendicular to the laminating direction.

It has been found through careful research that, under the same surface condition, the resistance to be overcome is largest when the shrinkage of the polarization layer starts. If the surface is discontinuous, larger resistance is to be overcome for forming a distortion. Therefore, in the embodiment of the invention, the adhesive regions and the non-adhesive regions are formed alternatively along the laminating direction of the polarization layer (i.e., discontinuous), which can increase the resistance to the shrinkage; and the adhesive regions and the non-adhesive regions are alternatively formed along the direction perpendicular to the laminating direction of the polarization layer, which enables the polarization layer to have the minimum shrinkage resistance along the direction in contrast with other directions. Therefore, when the polarization film in the structure according to the embodiment is affixed onto surface of the color filter substrate or the array substrate, a plurality of round shaped air layers are formed at the interface between the polarization film and the color filter substrate or the array substrate, which enables the shrinkage extent of the polarization film in the laminating direction and that in the directions other than the laminating direction to become closer to each other. In the embodiment, the hole groups may also be ellipse shaped holes, quadrangle shaped holes, polygon shaped holes or the holes with other regulated shapes. The technical shortcomings of light leakage and non-uniform luminance can be also avoided according to the embodiment.

The invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A polarization film comprising:
   at least a planar polarization layer that extends in a plane and is stretched along a predetermined direction to realize polarization, the predetermined direction being in the plane of the planar polarization layer in which the planar polarization layer extends, and
   an adhesive layer that is attached on a surface of the planar polarization layer and capable of being affixed onto a base, wherein the adhesive layer and the planar polarization layer are bonded together in the plane of the planar polarization layer, and the adhesive layer has a maximal shrinkage resistance in the predetermined direction in the plane of the planar polarization layer.

2. The polarization film of claim 1, wherein the adhesive layer has a minimal shrink resistance in a direction perpendicular to the predetermined direction of the polarization layer in the plane of the planar polarization layer.

3. The polarization film of claim 1, wherein the adhesive layer comprises a plurality of adhesive regions and a plurality of non-adhesive regions, and the adhesive regions and the non-adhesive regions are arranged alternatively along the predetermined direction of the planar polarization layer.

4. The polarization film of claim 3, wherein the non-adhesive regions are elongated holes extending along a direction perpendicular to the predetermined direction of the planar polarization layer.

5. The polarization film of claim 4, wherein the length of the elongated holes decreases gradually along the predetermined direction of the planar polarization layer.

6. The polarization film of claim 3, wherein the non-adhesive regions are hole groups that are aligned along a direction perpendicular to the predetermined direction of the planar polarization layer.

7. The polarization film of claim 6, wherein the number of the holes in the hole groups decreases gradually along the predetermined direction of the planar polarization layer, and the alternating times for the adhesive regions and the non-adhesive regions decrease gradually along the direction perpendicular to the predetermined direction of the planar polarization layer.

8. The polarization film of claim 1, further comprising a surface treatment layer, a first support layer, and a second support layer, wherein the planar polarization layer is interposed between the first support layer and the second support layer.

* * * * *